(12) United States Patent
Inose et al.

(10) Patent No.: US 7,051,355 B1
(45) Date of Patent: May 23, 2006

(54) RECEIVING APPARATUS, RECEIVING METHOD, AND PROVIDING MEDIUM

(75) Inventors: Kenji Inose, Chiba (JP); Katsumi Oishi, Tokyo (JP); Hirofumi Yuchi, Kanagawa (JP); Haruhiko Yata, Tokyo (JP); Keiichi Kurokawa, Kanagawa (JP); Yuichiro Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/534,288

(22) Filed: Mar. 23, 2000

(30) Foreign Application Priority Data

Mar. 26, 1999 (JP) ................................ 11-084097

(51) Int. Cl.
| | |
|---|---|
| H04N 7/16 | (2006.01) |
| H04N 7/20 | (2006.01) |
| H04N 5/445 | (2006.01) |
| H04N 7/167 | (2006.01) |
| G06F 13/00 | (2006.01) |
| G06F 3/00 | (2006.01) |

(52) U.S. Cl. ............................ 725/71; 725/25; 725/27; 725/37; 725/38; 725/39; 725/40; 725/48; 725/63; 725/68; 725/139; 725/140; 725/151; 725/152; 380/241

(58) Field of Classification Search .................. 725/25, 725/27, 63, 68, 71, 50, 131–134, 139–142, 725/151–153, 37–40, 48; 380/241
See application file for complete search history.

(56) References Cited

U.S. PATENT DOCUMENTS

| 4,218,773 A | 8/1980 | Imamura | |
| 5,001,554 A * | 3/1991 | Johnson et al. | 725/8 |
| 5,341,216 A | 8/1994 | Hoffart | |
| 5,359,601 A | 10/1994 | Wasilewski et al. | |
| 5,682,195 A | 10/1997 | Hendricks et al. | |
| 5,699,104 A * | 12/1997 | Yoshinobu | 725/27 |
| 5,784,683 A * | 7/1998 | Sistanizadeh et al. | 725/73 |
| 5,978,649 A * | 11/1999 | Kahn | 725/25 |
| RE36,988 E * | 12/2000 | Johnson et al. | 725/25 |
| 6,160,546 A * | 12/2000 | Thompson et al. | 725/43 |
| 6,331,877 B1 * | 12/2001 | Bennington et al. | 725/40 |

(Continued)

FOREIGN PATENT DOCUMENTS

CN 1195253 A 10/1998

(Continued)

OTHER PUBLICATIONS

Kleine G: "Kabelkopfstellen fur Digital-TV", Feb. 16, 1996, Funkschau, Franzis-Verlag K.G. Munchen, DE Page(s) 38-41, XP000553428 ISSN: 0016-2841.

*Primary Examiner*—John Miller
*Assistant Examiner*—Michael W. Hoye
(74) *Attorney, Agent, or Firm*—Frommer Lawrence & Haug LLP; William S. Frommer; Thomas F. Presson

(57) ABSTRACT

In a step S1, when the user executes a tuning operation (a service-number input operation) on an input section, the information is output to a control section. In a step S3, the control section determines whether the service number selected in the step S1 corresponds to a promotion channel. When it is determined that the service number corresponds to a promotion channel, the procedure proceeds to a step S11. In the step S11, the control section displays on the monitor a message indicating that the selected service number is not found.

9 Claims, 11 Drawing Sheets

| U.S. PATENT DOCUMENTS | | | | |
|---|---|---|---|---|
| 6,357,046 B1* | 3/2002 | Thompson et al. | ......... | 725/139 |
| 6,373,528 B1* | 4/2002 | Bennington et al. | .......... | 725/39 |
| 6,418,556 B1* | 7/2002 | Bennington et al. | .......... | 725/40 |
| 6,728,967 B1* | 4/2004 | Bennington et al. | .......... | 725/43 |
| 2001/0014976 A1* | 8/2001 | Roop et al. | ................... | 725/91 |

| FOREIGN PATENT DOCUMENTS | | |
|---|---|---|
| EP | 0 849 958 | 6/1998 |
| WO | WO 95 25402 | 9/1995 |
| WO | WO 97 46016 | 12/1997 |

* cited by examiner

FIG. 1

| CHANNEL | 8:00 | | 9:00 | | 10:00 |
|---|---|---|---|---|---|
| 107 ASAHI | INTERMEDIATE ENGLISH CONVERSATION #3 | | INTERMEDIATE ENGLISH CONVERSATION #4 (VIEWED) | | |
| 108 ASAHI | | INTERMEDIATE ENGLISH CONVERSATION #5 | | INTERMEDIATE ENGLISH CONVERSATION #6 | |
| 109 ASAHI | INTERMEDIATE ENGLISH CONVERSATION #4 | | INTERMEDIATE ENGLISH CONVERSATION #5 (VIEWED) | | |
| 110 ASAHI | | INTERMEDIATE ENGLISH CONVERSATION #6 | | INTERMEDIATE ENGLISH CONVERSATION #3 (VIEWED) | |
| 111 JAPAN | MORI MOTONARI, STORY 6 | | MORI MOTONARI, STORY 7 (VIEWED) | MORI MOTONARI, STORY 8 | |
| 112 JAPAN | | MORI MOTONARI, STORY 6 (VIEWED) | | MORI MOTONARI, STORY 7 | MORI MOTONARI, STORY 8 |
| 113 JAPAN | | | MORI MOTONARI, STORY 6 | MORI MOTONARI, STORY 7 (VIEWED) | |
| 114 JAPAN | | | | | MORI MOTONARI, STORY 7 |
| 115 STV | WHITE BIRD #5 (VIEWED) | WHITE BIRD #6 | | WHITE BIRD #7 | WHITE BIRD #8 |

BROADCASTING TIME

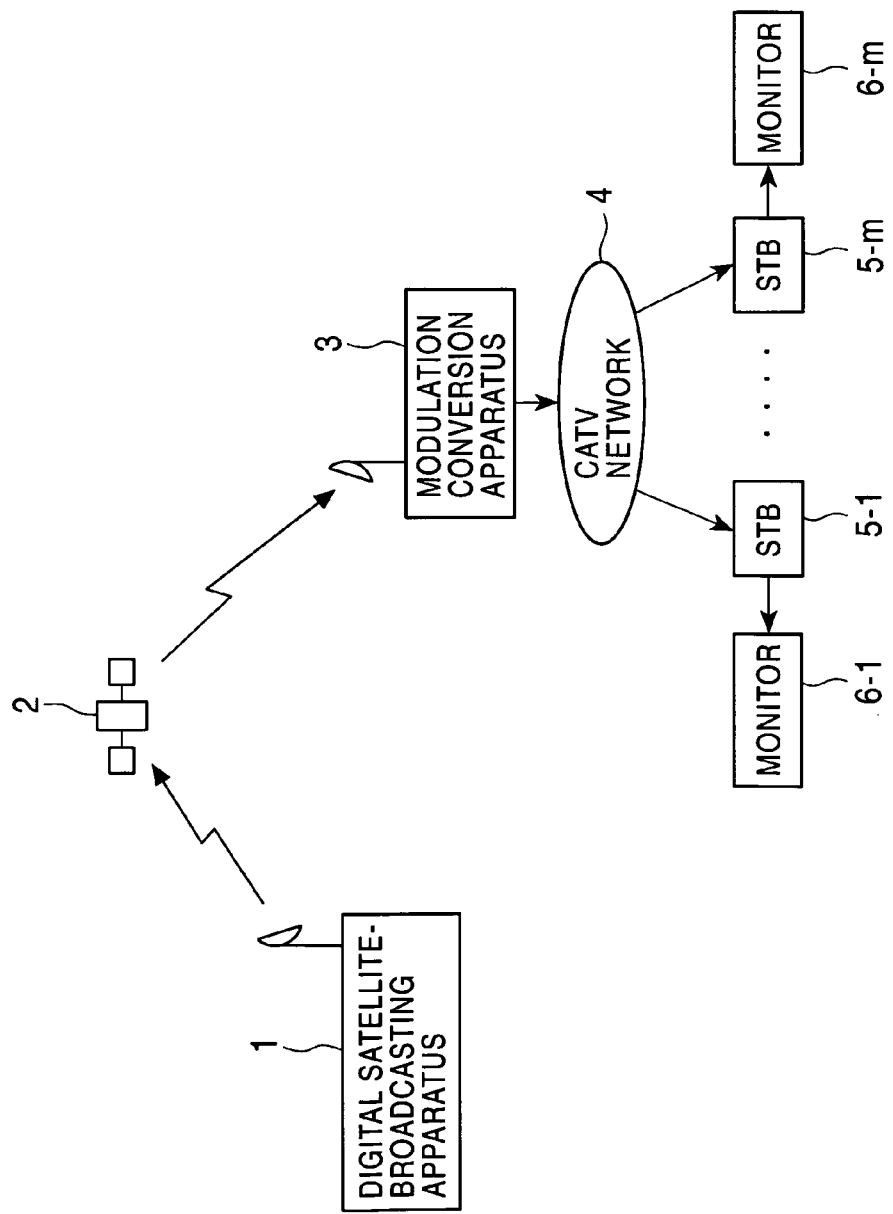

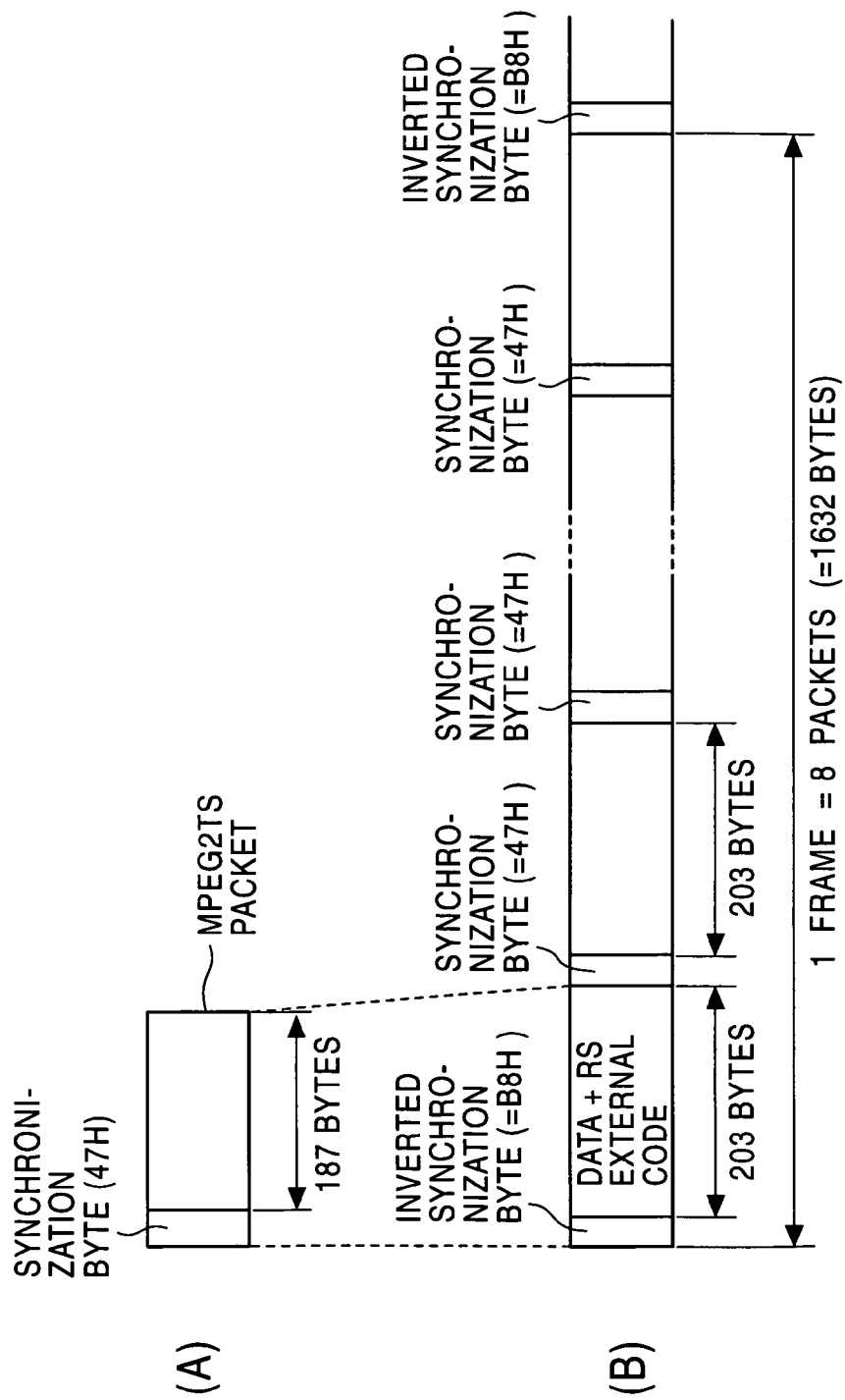

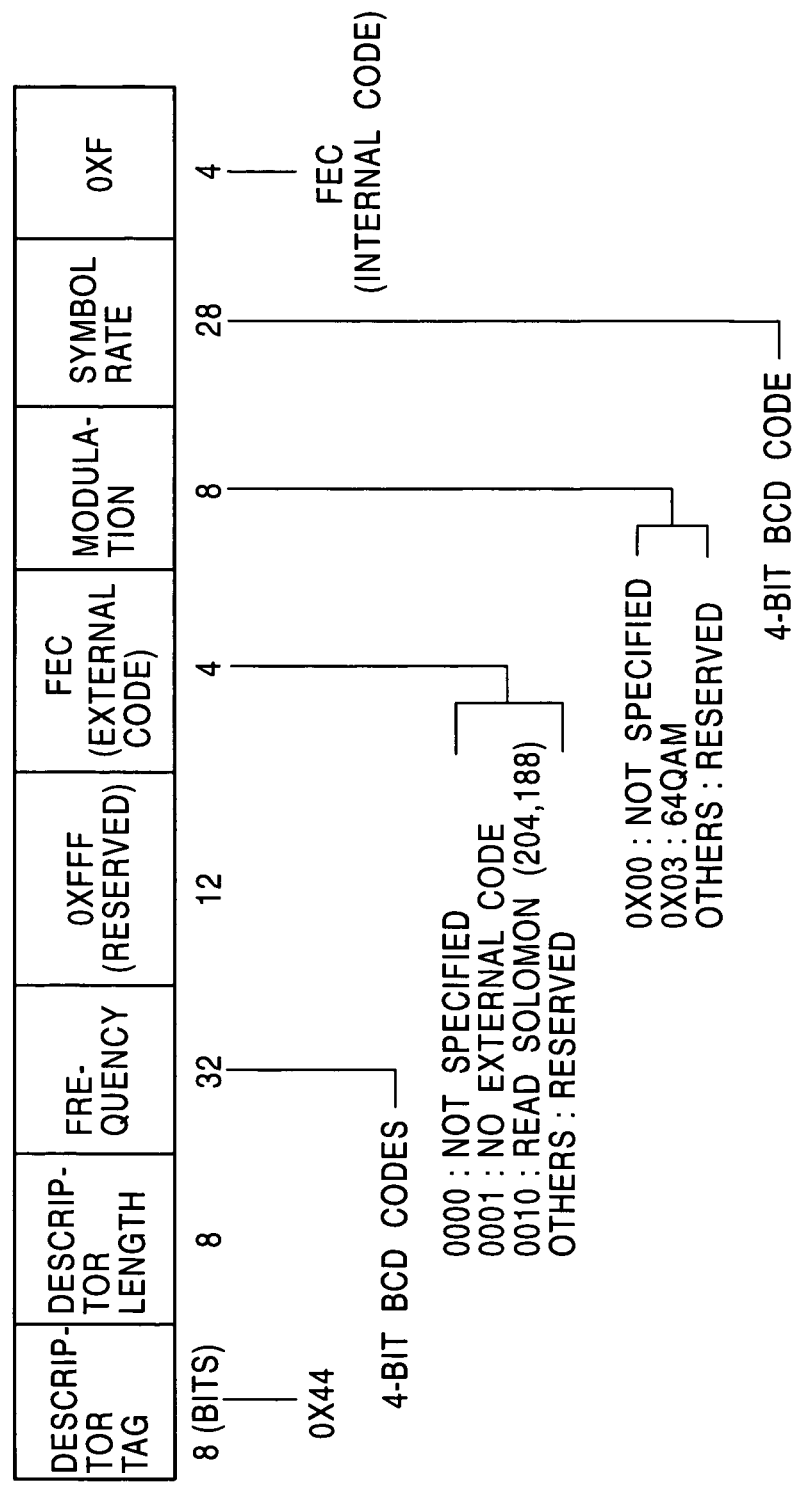

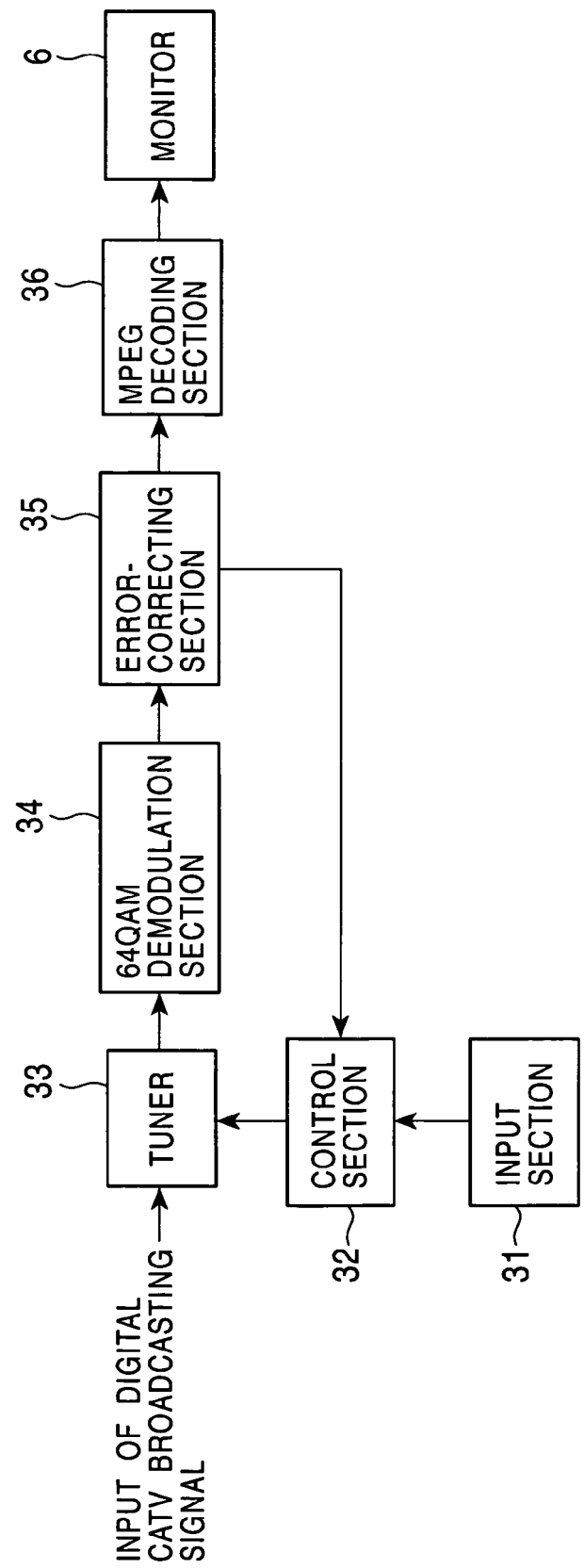

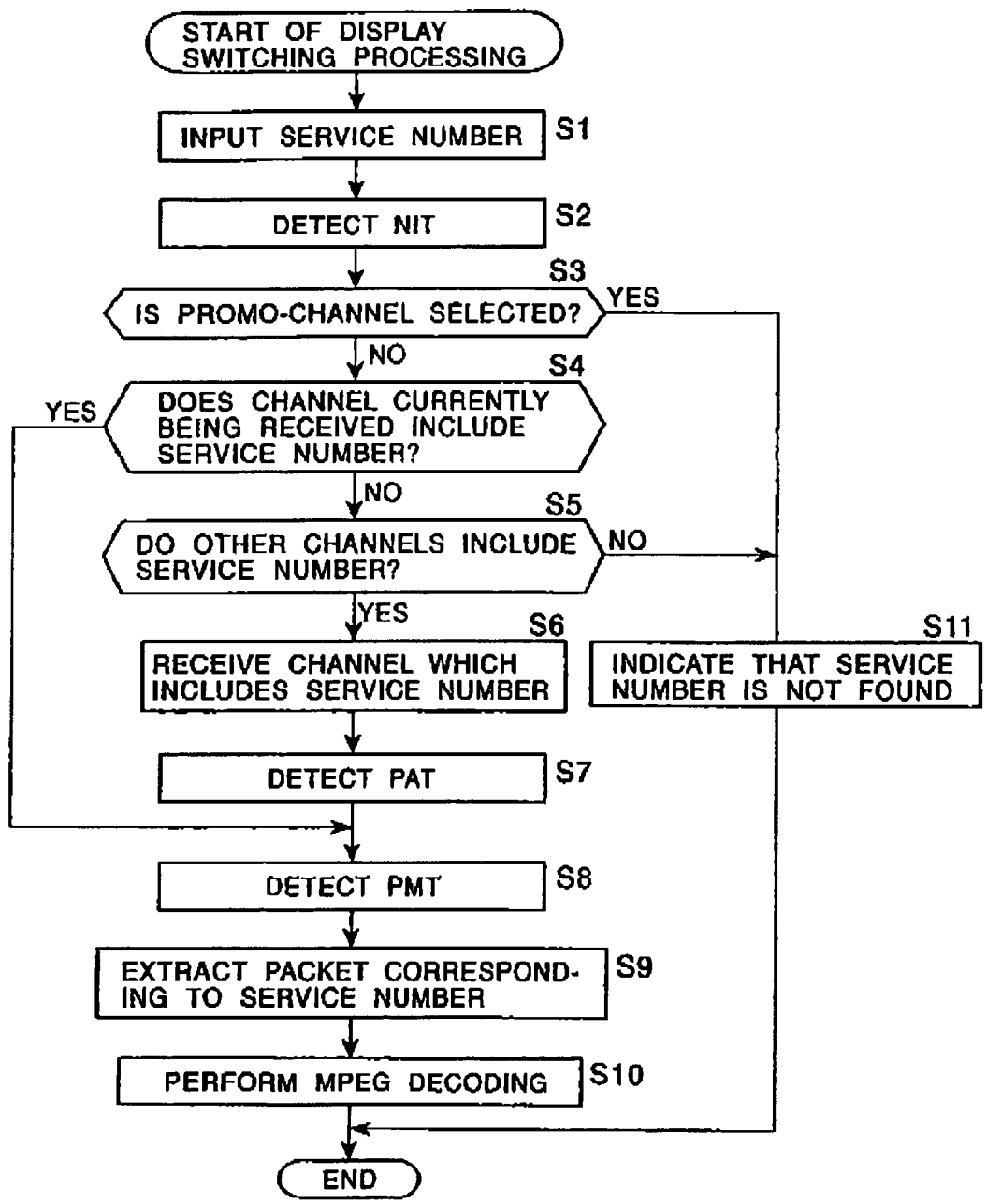

RECEIVING APPARATUS, RECEIVING METHOD, AND PROVIDING MEDIUM

BACKGROUND OF THE INVENTION

1. Field of the Invention

The present invention relates to receiving apparatuses, receiving methods, and providing media, and more particularly, to a receiving apparatus, a receiving method, and a providing medium appropriate for receiving a cable-TV signal in which a digital satellite-broadcasting signal is re-distributed.

2. Description of the Related Art

A re-multiplexing method and a modulation conversion method are known as technologies for re-distributing a digital satellite-broadcasting signal, such as that used in SkyPerfectTV (trademark), to a cable-TV (hereinafter called CATV) network.

In the re-multiplexing method, a digital satellite-broadcasting signal in which data for a plurality of channels are multiplexed for each transponder in a satellite is divided into data for each channel, and only data for channels to be re-distributed is extracted, re-multiplexed, and distributed to a CATV network. In the modulation conversion method, while data for a plurality of channels are multiplexed for each transponder in a satellite, the used modulation method is converted from the quadrature phase shift keying (QPSK) method to the quadrature amplitude modulation (64QAM) method and the data is distributed to a CATV network.

When a digital satellite-broadcasting signal is distributed to a CATV network, a signal (hereinafter called an EPG signal) for displaying an electronic program guide (EPG), such as that shown in FIG. 1, included in the digital satellite-broadcasting signal also needs to be distributed to the CATV network. When the modulation conversion method is used, a multiplexed signal sent from a transponder which transfers a signal including the EPG signal is distributed to the CATV network.

The transponder which transfers a signal including the EPG signal is usually a transponder (hereinafter called a promo-transponder) for transferring a promotion signal. A signal transferred from the promo-transponder is formed by multiplexing the EPG signal and a signal for each channel for promoting a program to be broadcasted by the channel, that is, a promo-channel.

Digital satellite-broadcasting business parties and CATV business parties think in some cases that a promo-channel in digital satellite broadcasting should not be distributed to CATV subscribers. When a conventional CATV set-top box is used, however, it is difficult to set such that CATV subscribers cannot view a promo-channel of digital satellite broadcasting.

SUMMARY OF THE INVENTION

The present invention has been made in consideration of the above situations. Accordingly, it is an object of the present invention to prevent CATV subscribers from viewing a promo-channel of digital satellite broadcasting.

The foregoing object is achieved in one aspect of the present invention through the provision of a receiving apparatus for receiving a second digital broadcasting signal generated by applying a modulation conversion method to a first digital broadcasting signal, including input means for inputting a service number which the user selects; determination means for determining whether the service number is a predetermined service number; reporting means for reporting to the user that the information corresponding to the service number is not found, when the determination means determines that the service number is the predetermined service number; and extracting means for extracting the information corresponding to the service number from the second digital broadcasting signal when the determination means determines that the service number is not the predetermined service number.

The foregoing object is achieved in another aspect of the present invention through the provision of a data conversion apparatus for receiving a first digital broadcasting signal and for generating a second digital broadcasting signal, including detection means for detecting a network information table in the received first digital broadcasting signal; storage means for storing the network information table detected by the detection means; control means for reading the network information table stored in the storage means, for changing a part of the data of the network information table, and for generating a network information table used for the second digital broadcasting signal; and transmitting means for transmitting the second digital broadcasting signal, including the generated network information table, to the outside.

The foregoing object is achieved in still another aspect of the present invention through the provision of a data conversion method for receiving a first digital broadcasting signal and for generating a second digital broadcasting signal, including a detection step of detecting a network information table in the received first digital broadcasting signal; a storage step of storing the network information table detected in the detection step; a control step of reading the network information table stored in the storage step, of changing a part of the data of the network information table, and of generating a network information table used for the second digital broadcasting signal; and a transmitting step of transmitting the second digital broadcasting signal, including the generated network information table, to the outside.

The foregoing object is achieved in yet another aspect of the present invention through the provision of a receiving method for a receiving apparatus for receiving a second digital broadcasting signal generated by applying a modulation conversion method to a first digital broadcasting signal, including an input step of inputting a service number which the user selects; a determination step of determining whether the service number is a predetermined service number; a reporting step of reporting to the user that the information corresponding to the service number is not found, when it is determined in the determination step that the service number is the predetermined service number; and an extracting step of extracting the information corresponding to the service number from the second digital broadcasting signal when it is determined in the determination step that the service number is not the predetermined service number.

The foregoing object is achieved in a further aspect of the present invention through the provision of a providing medium for providing a computer-readable program which makes a receiving apparatus for receiving a second digital broadcasting signal generated by applying a modulation conversion method to a first digital broadcasting signal execute processing, the processing including an input step of inputting a service number which the user selects; a determination step of determining whether the service number is a predetermined service number; a reporting step of reporting to the user that the information corresponding to the service number is not found, when it is determined in the determination step that the service number is the predetermined service number; and an extracting step of extracting the information corresponding to the service number from the second digital broadcasting signal when it is determined in the determination step that the service number is not the predetermined service number.

As described above, according to the present invention, a service number which the user selects is input and it is determined whether the service number is a predetermined service number. When it is determined that the service number is not the predetermined service number, the information corresponding to the service number is extracted from the second digital broadcasting signal. When it is determined that the service number is the predetermined service number, it is reported to the user that the service number is not found. Therefore, it is possible that CATV subscribers cannot view the promo-channels of digital satellite broadcasting.

BRIEF DESCRIPTION OF THE DRAWINGS

FIG. 1 is a view showing an electronic program guide.

FIG. 2 is a block diagram showing an example structure of a CATV system.

FIG. 3 is a view showing the frame structure of MPEG2-TS packets.

FIG. 9 is a view showing the structure of a cable-delivery-system descriptor.

FIG. 10 is a block diagram showing an example structure of a set-top box 5 according to the present invention.

FIG. 11 is a flowchart of display switching processing performed in the set-top box 5 shown in FIG. 10.

DESCRIPTION OF THE PREFERRED EMBODIMENT

Before a set-top box according to the present invention is described, a CATV system for re-distributing digital satellite broadcasting to a CATV network will be described first by referring to FIG. 2. In the present specification, a system refers to a whole gear formed of a plurality of apparatuses and means; a CATV network refers not only to a so-called city-type cable TV system, which provides charged multi-channel services, but also to a common-antenna TV system used for an apartment complex and an area where TV signals are difficult to be received; a channel refers to a transport stream of Moving Picture Experts Group (MPEG) 2 which each transponder transmits and receives; and a service number refers to a number which the audience selects, which is conventionally called a channel. Therefore, one channel includes the information corresponding to a plurality of service numbers.

In the CATV system, a digital satellite-broadcasting apparatus 1 converts audio-visual (AV) data for a plurality of programs to MPEG-2 transport streams (hereinafter called MPEG2-TSs) conforming to the digital video broadcasting (DVB) standard, multiplexes them, modulates them by the QPSK method, converts them in frequency, and then sends them to a communication satellite 2 as a digital broadcasting signal for each of a plurality of transponders included in the communication satellite (CS) 2.

An MPEG2-TS transmitted from the digital satellite-broadcasting apparatus 1 will be described below by referring to FIG. 3 to FIG. 7. FIG. 3 shows the frame structure of a digital broadcasting signal in the DVB standard. Eight MPEG2-TS packets (FIG. 3(A)) form one frame (FIG. 3(B)). In this case, a synchronization byte (=47H) in a packet is inverted (to B8H) every eight packets to obtain a frame synchronization. Each MPEG2-TS packet includes a Reed-Solomon (204, 188) error-correcting code. This digital broadcasting data is modulated by the QPSK method and converted in frequency to form a digital broadcasting signal.

Figure 4:
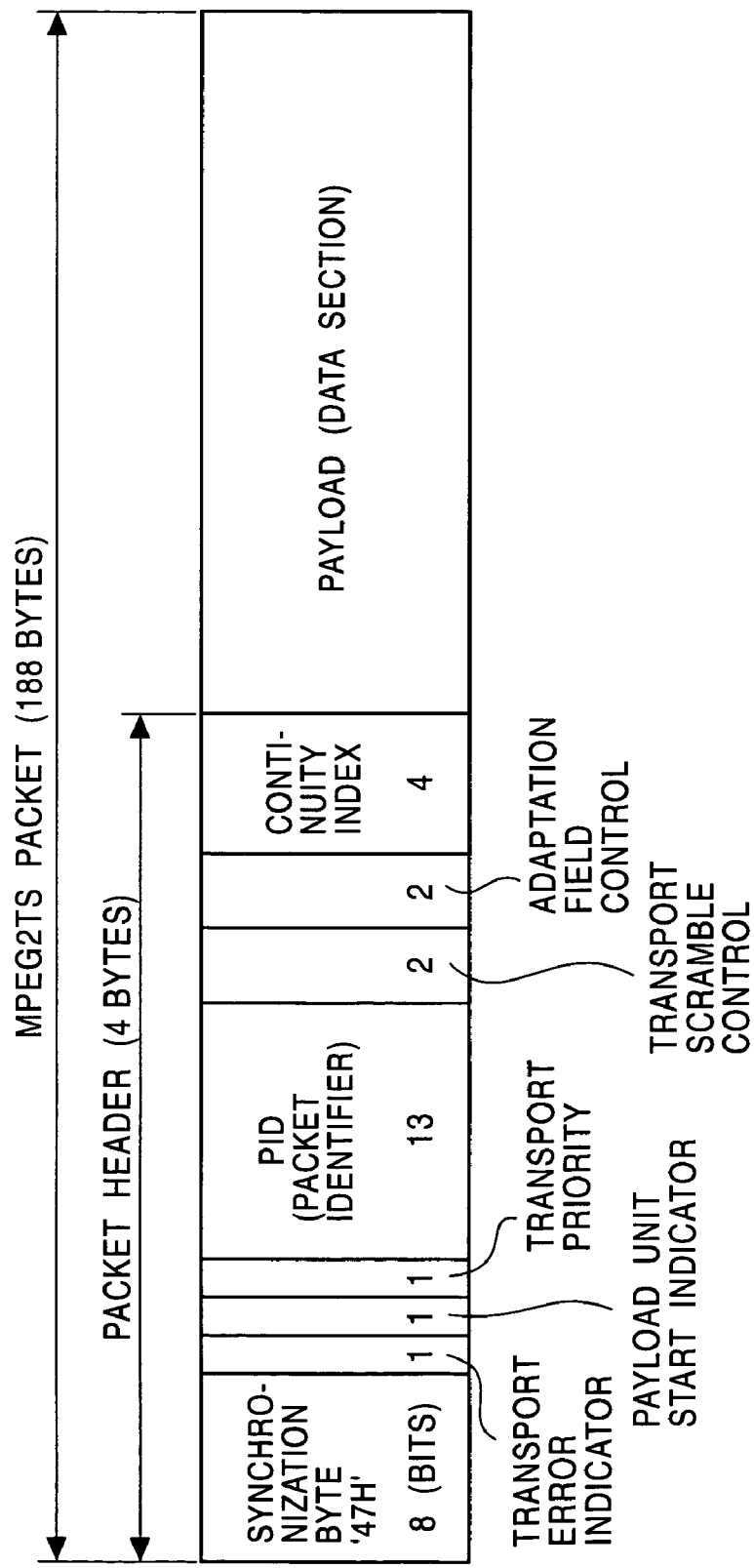
FIG. 4 is a view showing the packet structure of an MPEG2-TS packet.

FIG. 4 shows the packet structure of an MPEG2-TS packet. Among 188 bytes, the top four bytes form a packet header. The packet header includes a packet identifier (hereinafter called a PID) indicating the attribute of an individual stream (data string) of the packet. A payload (data section) includes a network information table (NIT), a program association table (PAT), and a program map table (PMT) as program specific information (hereinafter called PSI) specified in the MPEG-2 method.

The PSI is information required for implementing a simple tuning operation and a program selection. The NIT indicates physical information related to a transmission line, such as the orbit of the communication satellite 2, the polarized wave of a digital satellite signal, the frequency of each transponder, and the PID of the PAT corresponding to the numbers of programs transferred by each transponder. The PAT indicates the PID of a PMT which holds the information of packets constituting a program for each program number. The PMT shows the PIDs of packets of video data, audio data, and additional data constituting a program for each program number.

Figure 5:
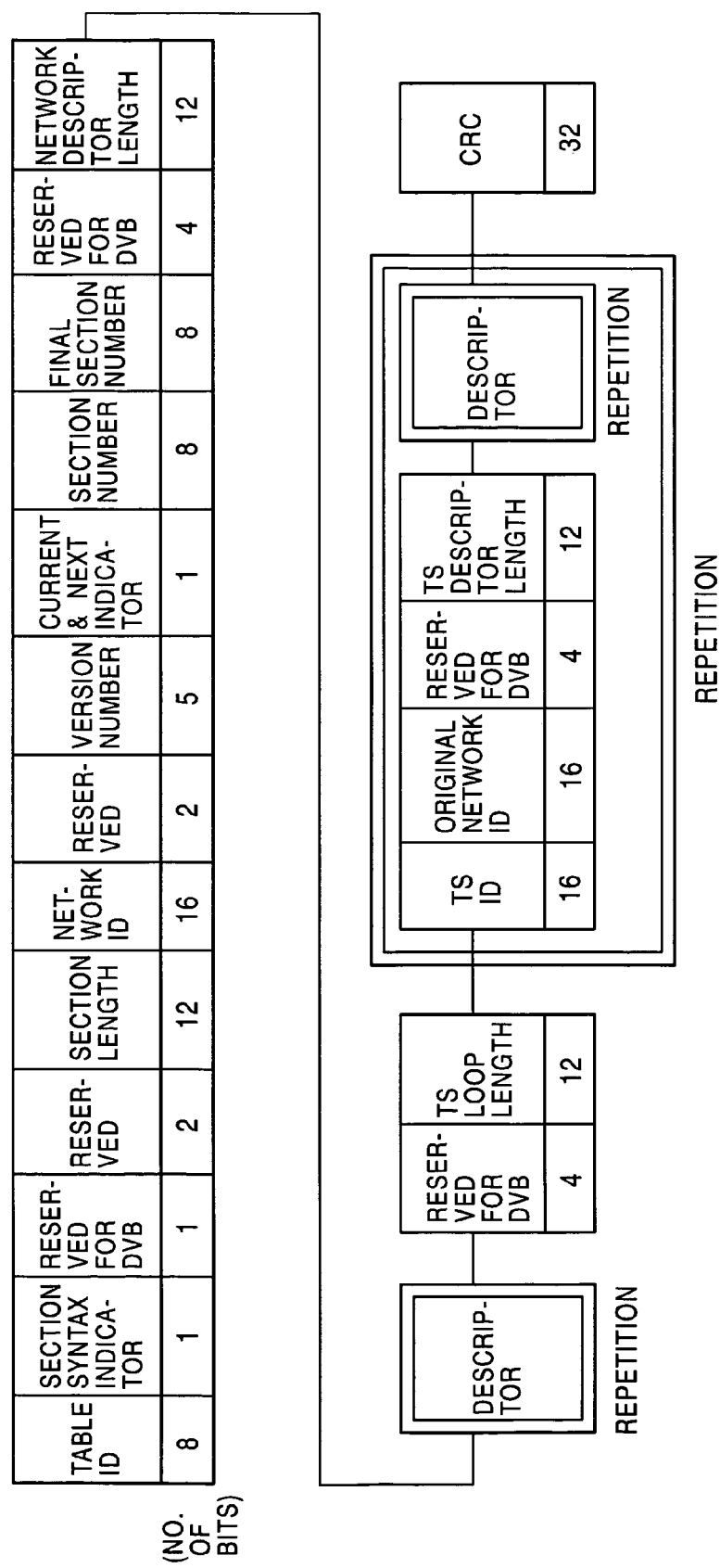
FIG. 5 is a view showing the table structure of an NIT.

FIG. 5 shows the table structure of the NIT. A table ID shows the type of the table. It is set to "0x40" for the network concerned, and is set to "0x41" for the other networks. A section syntax indicator shows whether the NIT is formed of a single section. A section length indicates the length of the total data following the section length. A network ID is used for identifying a network (corresponding to a satellite in satellite broadcasting). A version number is incremented every time the NIT is updated. A current & next indicator is used for identifying an effective version when the NITs having the current and next version numbers are transmitted at the same time. A section number shows the current section number. The last section number indicates the number of the last section among a plurality of sections constituting the table. A network descriptor length shows the data length of the loop of a descriptor disposed immediately after the network descriptor length.

A TS loop length indicates the data length of a TS loop disposed immediately after the TS loop length. A TSID in the TS loop is the identification code of the transport stream, and corresponds to one transponder in satellite broadcasting (one channel in a CATV). An original-network ID indicates, when the digital broadcasting signal is re-sent from another network (source network), the network ID of the source network. A TS descriptor length indicates the total data length of the loop of a TS descriptor disposed immediately after the TS descriptor length.

A satellite-delivery-system descriptor and a service-list descriptor specified in the TS descriptor will be described below. The satellite-delivery-system descriptor is a first TS descriptor repeated according to the TS descriptor length and forms a pair together with a TSID. The service-list descriptor is a second or subsequent TS descriptor repeated according to the TS descriptor length, and indicates the ID of a service multiplexed in a stream sent from one transponder. Therefore, one TSID corresponds to a plurality (the number of multiplexed services) of service IDs.

Figure 6:
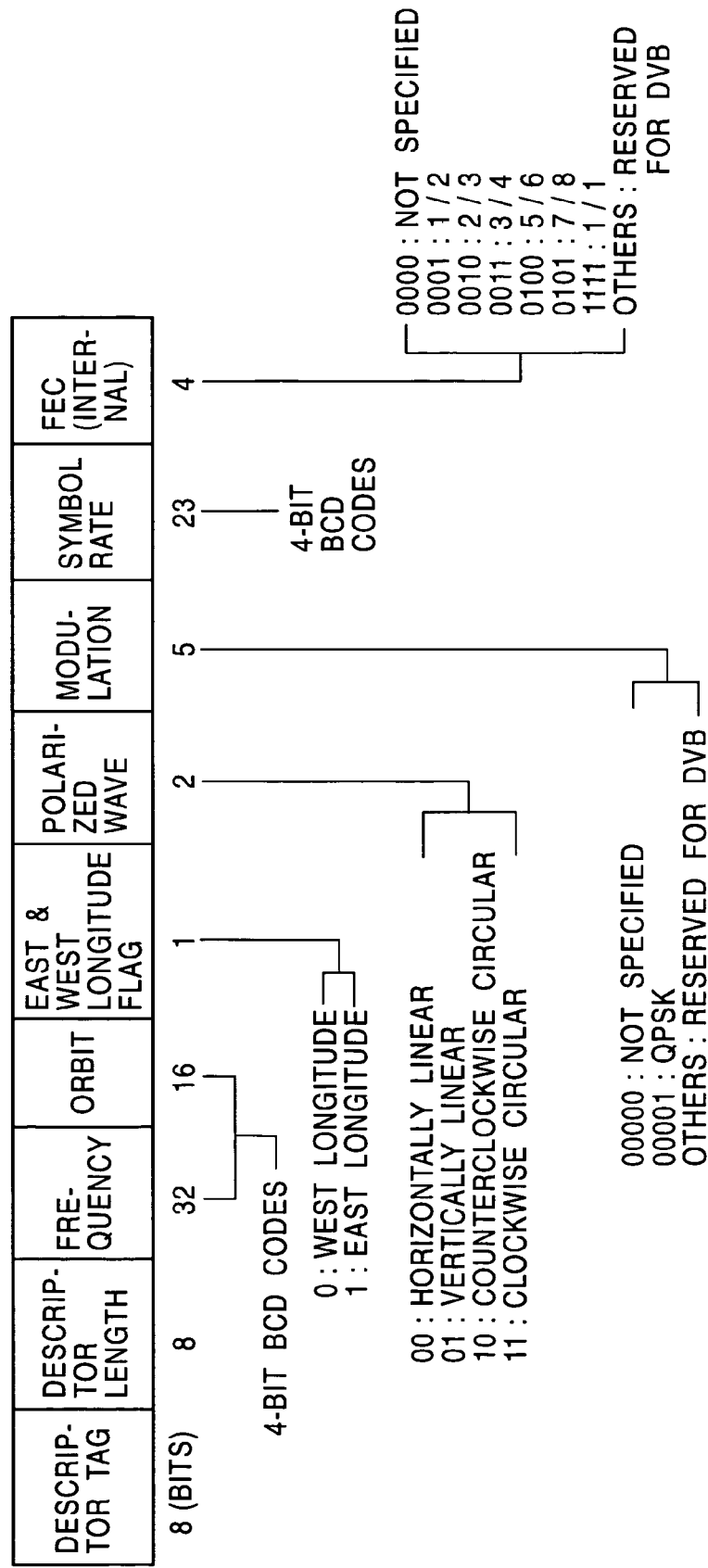
FIG. 6 is a view showing the structure of a satellite-delivery-system descriptor.

FIG. 6 shows the structure of the satellite-delivery-system descriptor. A descriptor tag shows the type of the descriptor. In this case (in the satellite-delivery-system descriptor), it is set to "0x43". A frequency indicates the transfer frequency of each transponder (channel). An orbit and a polarized wave show the orbit of the satellite and a polarized wave, respectively. Modulation to an inside error encoding rate (FEC) show a transfer-method specification.

Figure 7:
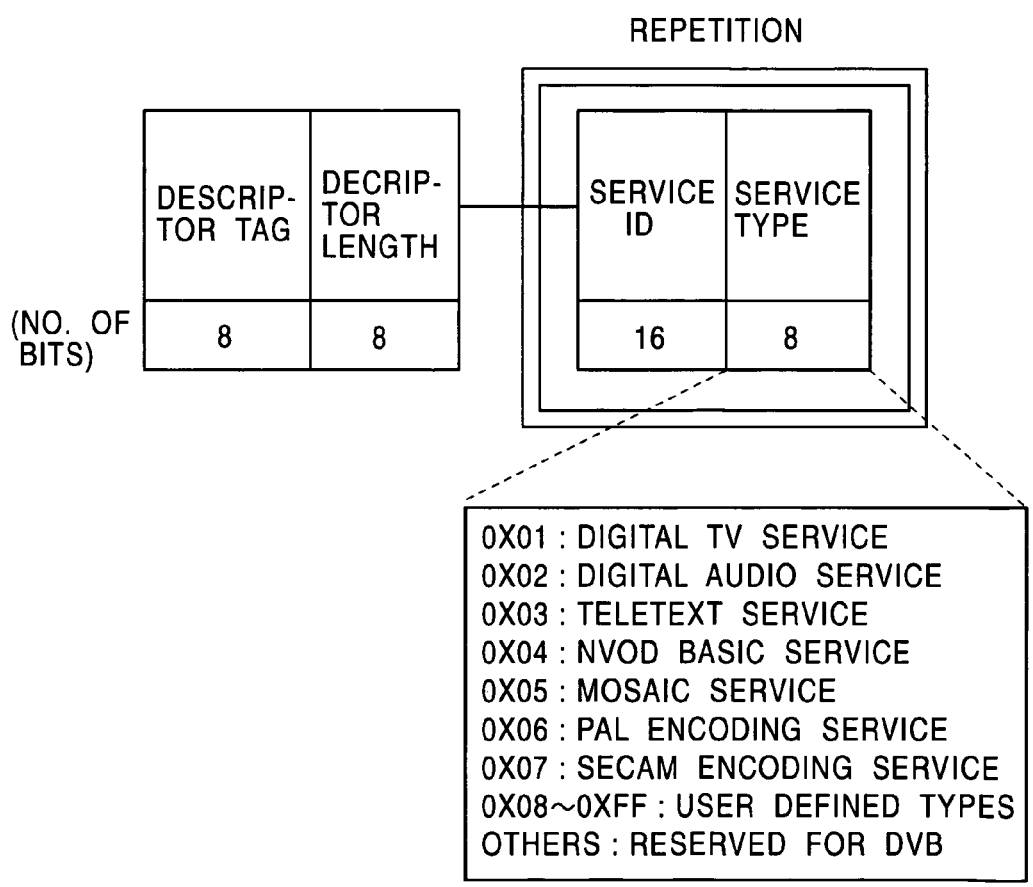
FIG. 7 is a view showing the structure of a service-list descriptor.

FIG. 7 shows the structure of the service-list descriptor. A descriptor tag shows the type of the descriptor. In this case (in the service-list descriptor), it is set to "0x41". A service ID is used for identifying the kind of a service. A service type shows the contents of a service, such as video, sound, and data.

Back to FIG. 2, the communication satellite 2 amplifies a digital broadcasting signal sent from the digital satellite-broadcasting apparatus 1 by the use of built-in first to n-th transponders (including a promo-transponder) and sends it to a modulation conversion apparatus 3 in a CATV station.

The modulation conversion apparatus 3 changes the transfer frequency and the modulation method of the digital broadcasting signal sent from the first to n-th transponders of the communication satellite 2 to generate a digital CATV broadcasting signal and outputs it to a CATV network 4.

Figure 8:
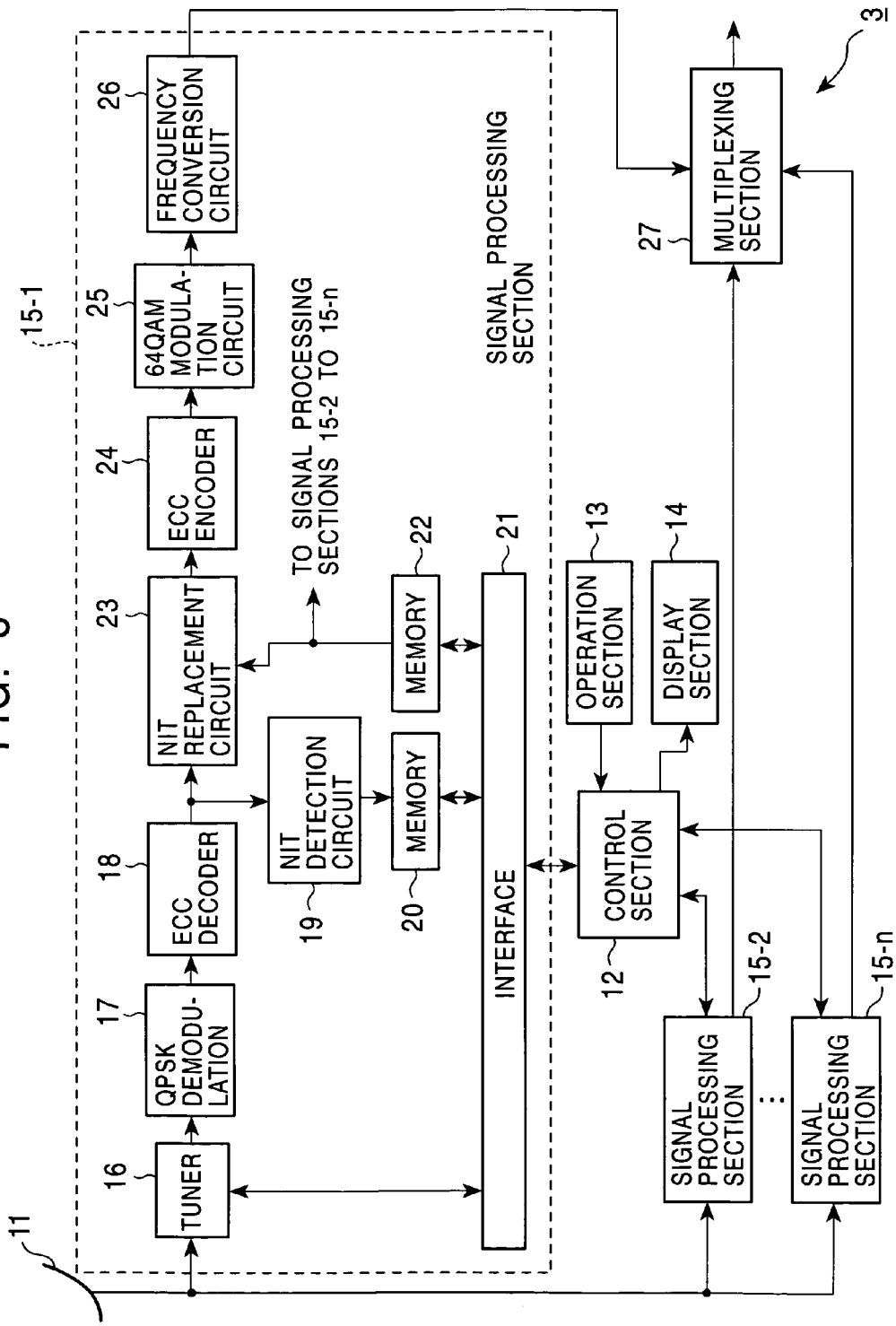
FIG. 8 is a block diagram showing an example structure of a modulation conversion apparatus 3.

FIG. 8 shows an example structure of the modulation conversion apparatus 3. This modulation conversion apparatus 3 is formed of an antenna 11 for receiving a digital broadcasting signal, a control section 12 for controlling the entire apparatus, an operation section 13 for inputting settings for the control section 12, a display section 14 for indicating the state of the modulation conversion apparatus 3, signal processing sections 15-1 to 15-n for processing digital broadcasting signals having a band width of 27 MHz sent from the first to n-th transponders of the communication satellite 2 to generate digital CATV broadcasting signals having a band width of 6 MHz, and a multiplexing section 27 for multiplexing the digital CATV broadcasting signals sent from the signal processing sections 15-1 to 15-n and for outputting the result to the CATV network 4.

In the signal processing section 15-1, a tuner 16 selects the digital broadcasting signal sent from the first transponder of the communication satellite 2 among the digital broadcasting signals input to the antenna 11, and outputs the obtained QPSK modulated signal to a QPSK demodulation circuit 17. The QPSK demodulation circuit 17 demodulates the input QPSK modulated signal and outputs the obtained signal having a frame structure to an ECC (error correction code) decoder 18. The ECC decoder 18 applies error correction to the signal having the frame structure and outputs the obtained MPEG2-TS to an NIT detection circuit 19 and to an NIT replacement circuit 23.

The NIT detection circuit 19 detects an NIT in the MPEG2-TS and stores it in a memory 20. The NIT stored in the memory 20 is read by the control section 12 through an interface (I/F) 21, changed to a CATV NIT, and stored in a memory 22.

Processing for changing a digital-satellite-broadcasting NIT to a CATV NIT performed by the control section 12 will be described below. Specifically, among a satellite-delivery-system descriptor and service-list descriptors in a digital-satellite-broadcasting NIT, those corresponding to a channel which is not re-distributed to the CATV network are deleted (in the modulation conversion apparatus 3 shown in FIG. 8, however, all channels are re-distributed). The satellite-delivery-system descriptor (shown in FIG. 6) included in the digital-satellite-broadcasting NIT is changed to a cable-delivery-system descriptor shown in FIG. 9. In service-list descriptors to be re-distributed, the service ID and the service time corresponding to a service which is not to be re-distributed are deleted. In addition, in the service-list descriptors to be re-distributed, the service ID of a service which is currently not distributed to the CATV network but is to be distributed in the future may be changed to a predetermined service ID for which special processing is to be performed in the set-top box 5.

A descriptor tag in a cable-delivery-system descriptor indicates the type of a cable-delivery-system descriptor, which is set to "0x44". A frequency shows the transfer frequency of a CATV stream (in the current case, the stream output from the signal processing section 15-1). An external code is set to "0x0010", which indicates a Reed-Solomon code (204, 188). Modulation to an internal code show a specification related to a CATV transfer method.

The NIT replacement circuit 23 reads the CATV NIT stored in the memory 22, replaces the NIT included in the MPEG2-TS sent from the ECC decoder 18 with the CATV NIT, and outputs the obtained MPEG2-TS, including the CATV NIT, to an ECC encoder 24.

The ECC encoder 24 adds an Reed-Solomon (204, 188) error-correcting code to the CATV MPEG2-TS sent from the NIT replacement circuit 23 and outputs the obtained signal having a frame structure to a 64QAM modulation circuit 25. The 64QAM modulation circuit 25 modulates the input frame-structure signal by the 64QAM method and outputs the obtained 64QAM-modulated signal to a frequency conversion circuit 26. The frequency conversion circuit 26 converts in frequency the input 64QAM-modulated signal and outputs the obtained CATV digital broadcasting signal to the multiplexing section 27.

In the same way, the signal processing sections 15-2 to 15-n process digital broadcasting signals sent from the second to n-th transponders of the communication satellite 2. In the present embodiment, the number of the signal processing sections 15 is equal to that of the transponders built in the communication satellite 2. In a CATV system, it is possible that the number of the signal processing sections 15 is set less than 15 if some channels are distributed among all channels of satellite broadcasting.

The multiplexing section 27 multiplexes digital broadcasting signals input from the signal processing sections 15-1 to 15-n and outputs to set-top boxes (STBs) 5-1 to 5-m (hereinafter collectively called a set-top box 5 when it is unnecessary to distinguish the set-top boxes 5-1 to 5-m individually) installed at subscriber's houses through the CATV network.

FIG. 10 shows an example structure of the set-top box 5 according to the present invention. In this set-top box 5, an input section 31 receives a tuning operation performed by the user (subscriber) and other operations, and outputs the information to a control section 32. The control section 32 controls each section in the set-top box 5 such that the video data and audio data corresponding to the service number which the user has selected are output to a monitor 6.

A tuner 33 extracts, under the control of the control section 32, the signal corresponding to the service number which the user has selected, from a digital CATV broadcasting signal input through the CATV network 4, and outputs the obtained 64QAM modulated signal to a 64QAM demodulation section 34.

The 64QAM demodulation section 34 demodulates the input 64QAM modulated signal and outputs the obtained frame-structure signal to an error-correcting section 35. The error-correcting section 35 applies error correction to the input frame-structure signal and outputs the obtained MPEG2-TS to an MPEG decoding section 36. The error-correcting section 35 also sends the PSI of the MPEG2-TS to the control section 32.

The MPEG decoding section 36 decodes the input MPEG2-TS and outputs the obtained video and audio signals, for example, to the monitor 6.

Display switching processing performed in the set-top box 5 will be described below by referring to a flowchart shown in FIG. 11. In a step S1, when the user executes a tuning operation (a service-number input operation) on the input section 31, the information is output to the control section 32. In a step S2, the control section 32 detects the NIT of the PSI input from the error-correcting section 35.

In a step S3, the control section 32 determines whether the service number selected in the step S1 corresponds to a promo-channel. When it is determined that the service number does not correspond to a promo-channel, the procedure proceeds to a step S4.

In the step S4, the control section 32 determines whether the channel currently being received includes the selected service number by referring to the PAT of the channel currently being received. When it is determined that the channel does not include the service number, the procedure proceeds to a step S5.

In the step S5, the control section 32 determines whether channels other than the channel currently being received include the selected service number by referring to the NIT detected in the step S2. When it is determined that channels other than the channel currently being received include the selected service number, the procedure proceeds to a step S6.

In the step S6, the control section 32 checks the transfer frequency of a channel which includes the selected service number by referring to the NIT, and makes the tuner 33 receive the MPEG2-TS of the channel. The MPEG2-TS of the channel which includes the selected service number, output from the tuner 33, is processed by the 64QAM demodulation section 34 and the error-correcting section 35.

In a step S7, the control section 32 detects the PAT of the PSI input from the error-correcting section 35. In a step S8, the control section 32 detects the PMT corresponding the selected service number by referring to the PAT detected in the step S7. In a step S9, the control section 32 recognizes the PIDs of the MPEG2-TS packets of the video and audio signals of the selected service number by referring to the PMT detected in the step S8, and sends the MPEG2-TS packets to the MPEG decoding section 36.

In a step S10, the MPEG decoding section 36 decodes the input MPEG2-TS packets and outputs the result to the monitor 6.

In the step S3, when it is determined that the service number selected in the step S1 corresponds to a promo-channel, that is, when the user selects a promo-channel in the step S1, the procedure proceeds to a step S11. When it is determined in the step S5 that channels other than the channel currently being received do not include the selected service number, the procedure also proceeds to the step S11. In the step S11, the control section 32 displays a message indicating that the selected service number is not found, on the monitor 6.

In the step S4, when it is determined that the channel currently being received includes the selected service number, the steps from S5 to S7 are skipped.

As described above, according to the set-top box 5 to which the present invention is applied, when the user selects the service number of a promo-channel, a message is displayed indicating that the service number is not found. The user cannot view the promo-channel. In a CATV network, however, since the channels of a satellite-broadcasting promo-transponder is re-distributed, it is possible to display the screen corresponding to an EPG signal included in a channel of the promo-transponder.

When the set-top box 5 is set such that the screen corresponding to a predetermined service number (called X), rather than that of the service number of a promo-channel, is not displayed, the modulation conversion apparatus 3 can control the display of a promo-channel. In other words, not to display a promo-channel, the modulation conversion apparatus 3 needs to set X to the service number of the promo-channel; and to display a promo-channel, the modulation conversion apparatus 3 needs to output X as is without changing X to the service number of the promo-channel.

A computer program which executes the foregoing processing can be provided for the user by information recording providing media, such as magnetic disks and CD-ROMs, and network providing media, such as the Internet and digital satellites.

What is claimed is:

1. A receiving apparatus for receiving a second digital broadcasting signal over a second transmission medium generated by applying a modulation conversion method to a first digital broadcasting signal adopted to be transmitted over a first transmission medium corresponding to non-distributed channels, said apparatus comprising:

input means for inputting a service number which a user selects;

detecting means for detecting a Network Information Table (NIT) from an error correcting section;

first determination means for determining whether the service number is one of one or more predetermined service numbers to which the user does not have access to because said service number corresponds to a promo-channel;

second determination means for determining whether a channel currently received by said user includes said promo-channel;

reporting means for reporting to the user that information corresponding to the service number is not available to the user, when said first determination means determines that the service number is one of the one or more predetermined service numbers;

extracting means for extracting information corresponding to the service number from the second digital broadcasting signal when said first determination means determines that the service number is not one of the one or more predetermined service numbers;

wherein service-list descriptors or satellite-delivery descriptors corresponding to services available via said first transmission medium corresponding to said non-distributed channels not available via said second transmission medium and identified by said one or more predetermined service numbers are deleted before being transmitted via said second transmission medium and reaching said receiving apparatus in order to prevent subscribers receiving services via said second transmission medium from viewing promotional material for services only available via said first transmission medium.

2. The receiving apparatus according to claim 1,
wherein the information corresponding to the predetermined service number is information of a program promotion in the first digital broadcasting signal.

3. The receiving apparatus according to claim 1,
wherein the first digital broadcasting signal is a digital satellite-broadcasting signal conforming to the DVB standard, and
the second digital broadcasting signal is a digital CATV broadcasting signal conforming to the DVB standard.

4. A receiving method for a receiving apparatus for receiving a second digital broadcasting signal over a second transmission medium generated by applying a modulation conversion method to a first digital broadcasting signal adopted to be transmitted over a first transmission medium corresponding to non-distributed channels, said method comprising:
an input step for inputting a service number which a user selects,
a detecting step for detecting a Network Information Table (NIT) from an error-correcting section;
a first determining step for determining whether the service number is one of one or more predetermined service numbers to which the user does not have access to because said service number corresponds to a promo-channel;
a second determining step for determining whether a channel currently received by said user includes said promo-channel;
a reporting step for reporting to the user that information corresponding to the service number is not available to the user, when said first determination means determines that the service number is one of the one or more predetermined service numbers;
an extracting step for extracting information corresponding to the service number from the second digital broadcasting signal when it is determined in the determining step that the service number is not the predetermined service number; and
a deleting step for deleting service-list descriptors or satellite-delivery descriptors corresponding to services available via said first transmission medium corresponding to said non-distributed channels not available via said second transmission medium and identified by said one or more predetermined service numbers before being transmitted via said second transmission medium and reaching said receiving apparatus in order to prevent subscribers receiving services via said second transmission medium from viewing promotional material for services only available via said first transmission medium.

5. The receiving method according to claim 4,
wherein the information corresponding to the predetermined service number is information of a program promotion in the first digital broadcasting signal.

6. The receiving method according to claim 4,
wherein the first digital broadcasting signal is a digital satellite-broadcasting signal conforming to the DVB standard, and
the second digital broadcasting signal is a digital CATV broadcasting signal conforming to the DVB standard.

7. A providing medium for providing a computer-readable program which causes a receiving apparatus to execute processing, the receiving apparatus receiving a second digital broadcasting signal over a second transmission medium generated by applying a modulation conversion method to a first digital broadcasting signal adopted to be transmitted over a first transmission medium corresponding to non-distributed channels, the processing comprising:
an input step for inputting a service number which a user selects;
a detecting step for detecting a Network Information Table (NIT) from an error-correcting section;
a first determining step for determining whether the service number is one of one or more predetermined service numbers to which the user does not have access to because said service number corresponds to a promo-channel;
a second determining step for determining whether a channel currently received by said user includes said promo-channel;
a reporting step for reporting to the user that information corresponding to the service number is not available to the user, when said first determination means determines that the service number is one of the one or more predetermined service number;
an extracting step for extracting information corresponding to the service number from the second digital broadcasting signal when it is determined in the determining step that the service number is not the predetermined service number; and
a deleting step for deleting service-list descriptors or satellite-delivery descriptors corresponding to services available via said first transmission medium corresponding to said non-distributed channels not available via said second transmission medium and identified by said one or more predetermined service numbers before being transmitted via said second transmission medium and reaching said receiving apparatus in order to prevent subscribers receiving services via said second transmission medium from viewing promotional material for services only available via said first transmission medium.

8. The providing medium according to claim 7,
wherein the information corresponding to the predetermined service number is information of a program promotion in the first digital broadcasting signal.

9. The providing medium according to claim 7,
wherein the first digital broadcasting signal is a digital satellite-broadcasting signal conforming to the DVB standard, and
the second digital broadcasting signal is a digital CATV broadcasting signal conforming to the DVB standard.

* * * * *